Figure 1:
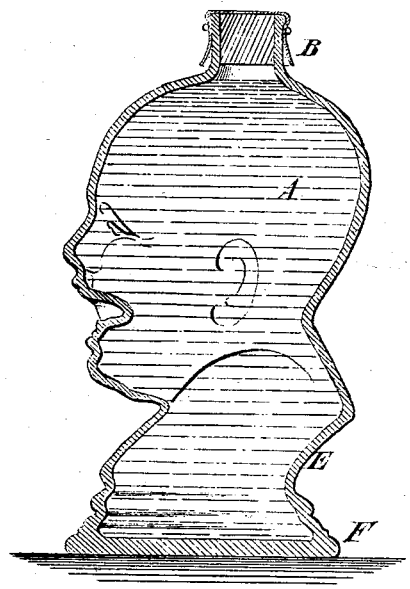
Figure 2:
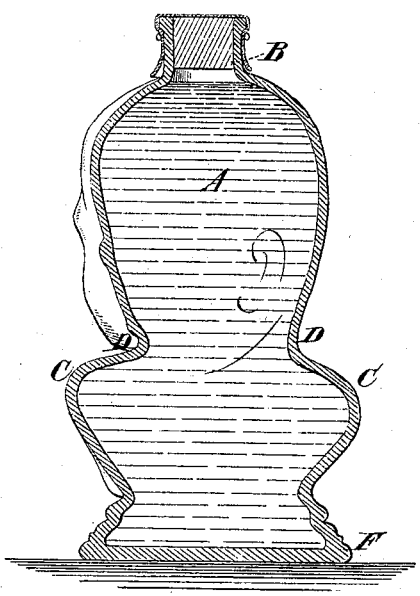

T. P. SPENCER.
Glass-Bottles.

No. 151,802.  Patented June 9, 1874.

WITNESSES:  INVENTOR:

UNITED STATES PATENT OFFICE.

THOMAS P. SPENCER, OF NEW YORK, N. Y.

IMPROVEMENT IN GLASS BOTTLES.

Specification forming part of Letters Patent No. 151,802, dated June 9, 1874; application filed April 18, 1874.

*To all whom it may concern:*

Be it known that I, THOMAS P. SPENCER, of the city, county, and State of New York, have invented a new and Improved Glass Bottle, of which the following is a specification:

My invention consists of a glass bottle for perfumery, made in the form of the bust of the human figure, with certain modifications of the shoulders in form and dimensions of the same and other parts, as compared with a true bust, to adapt it to a shape that is practicable to produce in glass by blowing it in molds.

In the accompanying drawing my improved bottle is represented in two different sectional elevations.

The head A, in this example, is made to represent a crying child. The nozzle B is formed in the top of the head.

The particular modifications of the true bust which I make to produce a form which it is practicable to produce in glass by blowing in molds consists in making the protuberant projections C with lines in gradual curves, both in vertical and horizontal section, as a substitute for the shoulders; also, making the neck to consist only of the mere contractions D between the shoulders and the head; also, making the back E, from the shoulders to the base F, sufficiently full to form lines which the glass will assume readily in the mold; and, also, making both the head and neck in great disproportion to the shoulders in respect of size, being proportionately much larger than the true size, so that from top to bottom the body of the bottle is so proportioned, and the angles are toned down so that the bubble of glass can be pressed into all the cavities and over the prominences of the mold without overstraining and reducing any part too thin, or rupturing the glass, which has always been the result of the many attempts that have heretofore been made to mold glass bottles in this design, owing to the projections of the shoulders of the natural bust being too great, the angles too abrupt, and the disproportions of the different parts too great.

Having thus described my invention, I claim as new and desire to secure by Letters Patent—

As a new article of manufacture, a blown-glass bottle in the form of a bust, having the head A with neck B for stopper, as shown and described.

THOMAS P. SPENCER.

Witnesses:
T. B. MOSHER,
ALEX. F. ROBERTS.